(12) United States Patent
Lee et al.

(10) Patent No.: US 11,099,331 B2
(45) Date of Patent: Aug. 24, 2021

(54) OPTICAL ADAPTOR

(71) Applicant: 3M INNOVATIVE PROPERTIES COMPANY, St. Paul, MN (US)

(72) Inventors: Boon K. Lee, Leander, TX (US); Alberto DeLosSantos, Georgetown, TX (US); Bing Hao, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/946,035

(22) Filed: Jun. 3, 2020

(65) Prior Publication Data

US 2021/0018694 A1 Jan. 21, 2021

Related U.S. Application Data

(60) Provisional application No. 62/875,713, filed on Jul. 18, 2019.

(51) Int. Cl.
*G02B 6/38* (2006.01)
*G01M 11/00* (2006.01)

(52) U.S. Cl.
CPC ........... *G02B 6/385* (2013.01); *G02B 6/3825* (2013.01); *G01M 11/31* (2013.01)

(58) Field of Classification Search
CPC ..................................................... G02B 6/385
See application file for complete search history.

(56) References Cited

U.S. PATENT DOCUMENTS

| 8,164,744 B2 * | 4/2012 | Narum .................. G01M 11/30 356/73.1 |
| D875,958 S | 2/2020 | Emslander |
| 10,802,225 B2 * | 10/2020 | Haase .................... G02B 6/385 |
| 2017/0168248 A1 * | 6/2017 | Hayauchi ............... G02B 6/383 |

* cited by examiner

*Primary Examiner* — Omar R Rojas
(74) *Attorney, Agent, or Firm* — Robert S. Moshrefzadeh

(57) ABSTRACT

An optical adaptor for inspection of a desired surface of an optical ferrule is provided. The optical ferrule is disposed in, and has a first position relative to, a housing of the optical ferrule. The optical adaptor includes a front portion including an open front end for insertion into the housing of the optical ferrule from an open mating end of the housing and for receiving at least a portion of the desired surface of the optical ferrule. The front portion includes a receiving surface for receiving at least a portion of the optical ferrule and causing the optical ferrule to change its position from the first position to a different second position. An image forming surface forms an image of the desired surface of the optical ferrule, thereby allowing a viewing of the optical ferrule from an open rear end of the optical adaptor.

15 Claims, 14 Drawing Sheets

OPTICAL ADAPTOR

TECHNICAL FIELD

The present disclosure relates generally to an optical adaptor, and in particular, to an optical adaptor for use with an optical ferrule.

BACKGROUND

An optical ferrule is generally used for optical coupling of optical fibers. The optical ferrule is typically located within an optical connector.

SUMMARY

In one aspect, the present disclosure provides an optical adaptor for facilitating inspection of a desired surface of an optical ferrule by an inspection probe. The optical ferrule is disposed in, and has a first position relative to, a housing of the optical ferrule. The optical adaptor includes a rear portion having an open rear end for receiving at least a portion of the inspection probe. The optical adaptor further includes a front portion extending forwardly from the rear portion. The front portion includes an open front end for insertion into the housing of the optical ferrule from an open mating end of the housing and for receiving at least a portion of the desired surface of the optical ferrule for inspection by the inspection probe received in the open rear end. The front portion further includes a receiving surface for receiving and supporting at least a portion of the optical ferrule thereon and causing the optical ferrule to change its position relative to the housing from the first position to a different second position and an image forming surface for forming an image of the desired surface of the optical ferrule. The image is captured by the inspection probe.

In another aspect, the present disclosure provides an optical adaptor for mating with an optical connector assembly. The optical connector assembly includes an optical ferrule disposed in a housing. The optical adaptor includes opposing top and bottom walls extending along a length of the optical adaptor and defining opposing open front and rear ends of the optical adaptor. The optical adaptor further includes a middle wall disposed between the top and bottom walls and including a support surface portion facing the top wall. The optical adaptor further includes a reflective surface disposed on an interior side of the bottom wall proximate the open front end. The reflective surface generally faces the middle wall and forms an oblique angle with the support surface portion, such that the optical adaptor is configured to mate with the optical connector when the top and bottom walls are at least partially inserted into the housing of the optical connector. The insertion causes the optical ferrule to rest on the support surface portion and change its position relative to the housing. The reflective surface allows a viewing of the optical ferrule from the open rear end.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

An optical ferrule is generally used for optical coupling of optical fibers. The optical ferrule is typically located within an optical connector. It may be desirable to inspect a surface of the optical ferrule or inspect certain parameters of light transmitted by the optical ferrule. A surface of the optical ferrule is generally not located in direct view when the optical ferrule is disposed within the optical connector. Consequently, it may not be possible to inspect the surface of the optical ferrule when the optical ferrule is disposed within the optical connector. However, upon removal from the optical connector, the optical ferrule may be susceptible to scratches, damage, or contamination with debris which results in loss of light transmission quality. Therefore, it may not be desirable to remove the optical ferrule from the optical connector for various purposes, such as inspection of the surface.

The present disclosure relates to an optical adaptor for facilitating inspection of a desired surface of an optical ferrule by an inspection probe. The optical adaptor can mate with a housing of an optical connector assembly. The optical ferrule is disposed in a housing of the optical connector assembly. The optical adaptor includes a receiving surface for receiving and supporting at least a portion of the optical ferrule thereon. The receiving surface causes the optical ferrule to change its position relative to the housing from a first position to a different second position. The optical adaptor further includes an image forming surface for forming an image of the desired surface of the optical ferrule. The second position is a predetermined position that allows inspection of the desired surface irrespective of the first position of the optical ferrule. The optical adaptor may therefore be used with optical ferrules located in different first positions. Further, the desired surface of the optical ferrule may be inspected without removing the optical ferrule from the housing. The optical adaptor may also be used with different inspection probes for capturing the image of the desired surface. Alternatively, the optical adaptor may allow viewing of the desired surface without any inspection probe. Additionally, the optical adaptor may enable an inspection of various parameters (e.g., quality, intensity etc.) of light transmitted by the optical ferrule.

Figure 1:
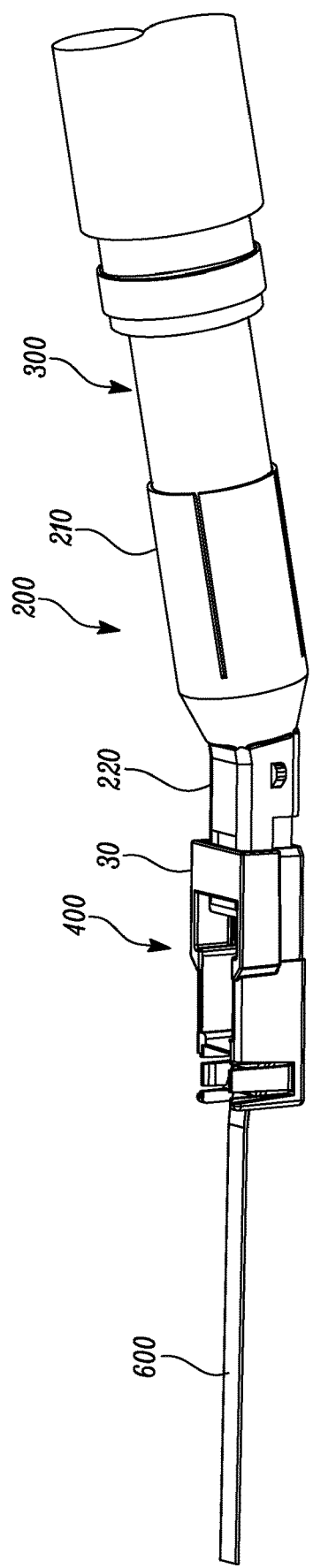
FIG. 1 is a perspective view of an optical connector assembly, an optical adaptor, and an inspection probe coupled to each other according to one embodiment of the present disclosure.
Figure 2:
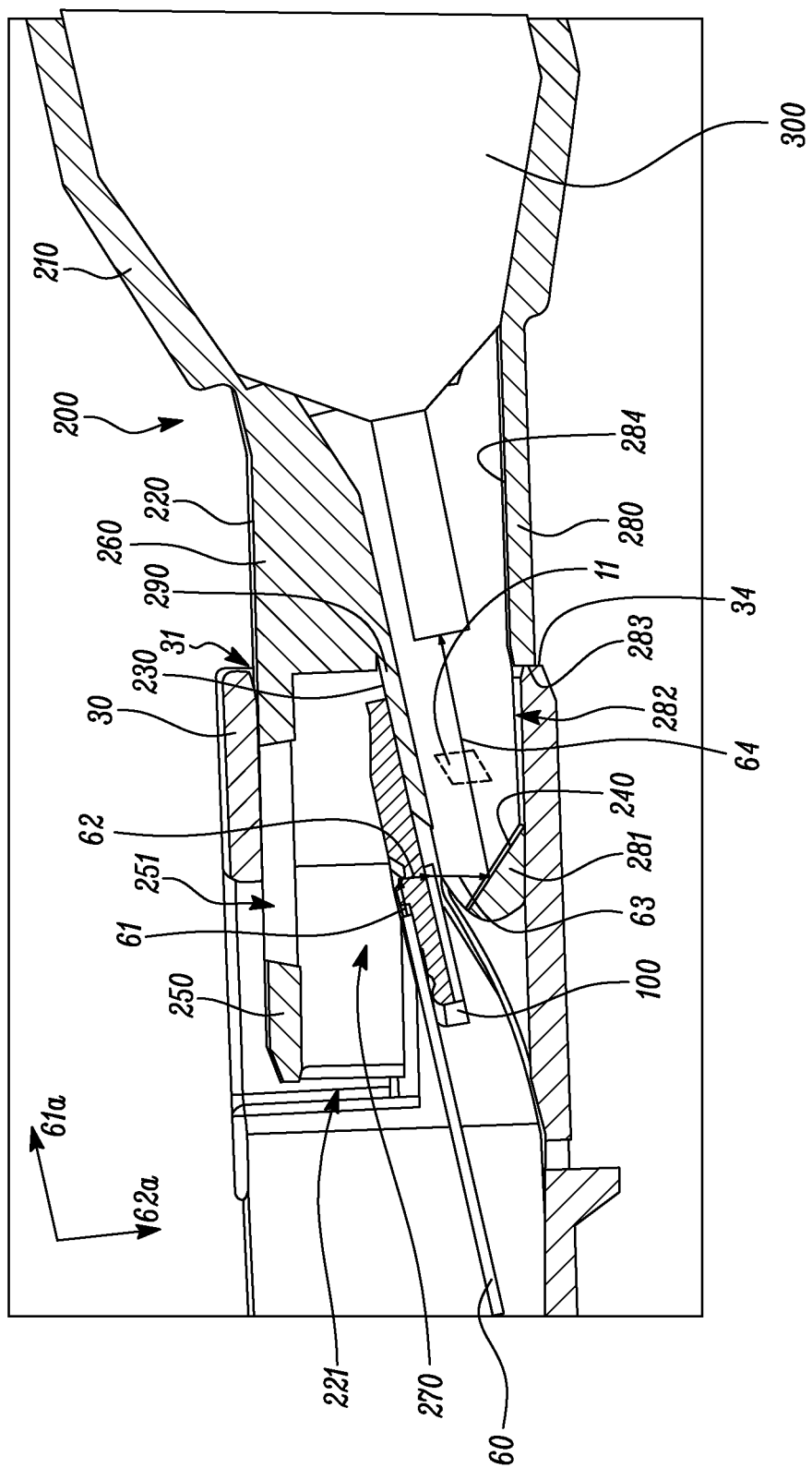
FIG. 2 is a detailed sectional view of the optical connector assembly, the optical adaptor, and the inspection probe according to one embodiment of the present disclosure.

Referring now to the Figures, FIGS. 1 and 2 illustrate an optical adaptor 200 coupled to an optical connector assembly 400 and an inspection probe 300. The inspection probe 300 may be any commercially available inspection probe. For example, the inspection probe 300 may be made by a manufacturer, such as EXFO, SUMIX, VIAVI Solutions, etc. The optical connector assembly 400 includes an optical ferrule 100 disposed in a housing 30 of the optical connector assembly 400. The optical adaptor 200 includes a rear portion 210 for receiving at least a portion of the inspection probe 300. The optical adaptor 200 further includes a front portion 220 for insertion into the housing 30 of the optical ferrule 100.

The optical adaptor 200 is provided for mating with the optical connector assembly 400. The optical adaptor 200 facilitates inspection of a desired surface 10 (shown in FIG. 4B) of the optical ferrule 100 by the inspection probe 300. The optical adaptor 200 can further mate with the optical connector assembly 400. In an unmated state of the optical connector assembly 400, the optical ferrule 100 is disposed in, and has a first position 101 (shown in FIG. 6A) relative to the housing 30 of the optical ferrule 100. In other words, the optical ferrule 100 is disposed in the first position 101 relative to the housing 30 when the optical connector assembly 400 is not mated with the optical adaptor 200. The first position 101 may be therefore a normal position of the optical ferrule 100 relative to the housing 30.

Figure 3A:
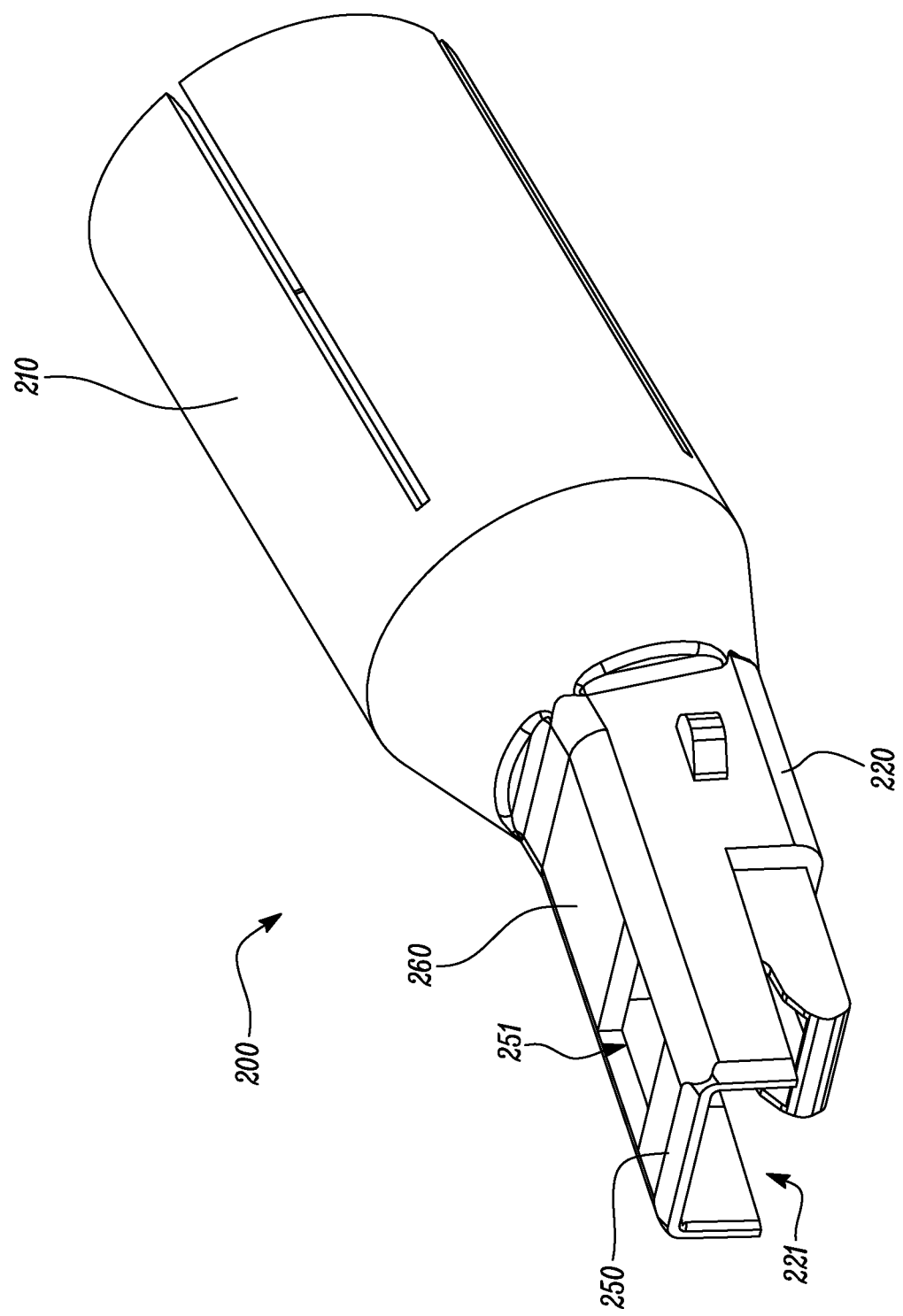
FIGS. 3A-3B are different perspective views of the optical adaptor according to one embodiment of the present disclosure.
Figure 3B:
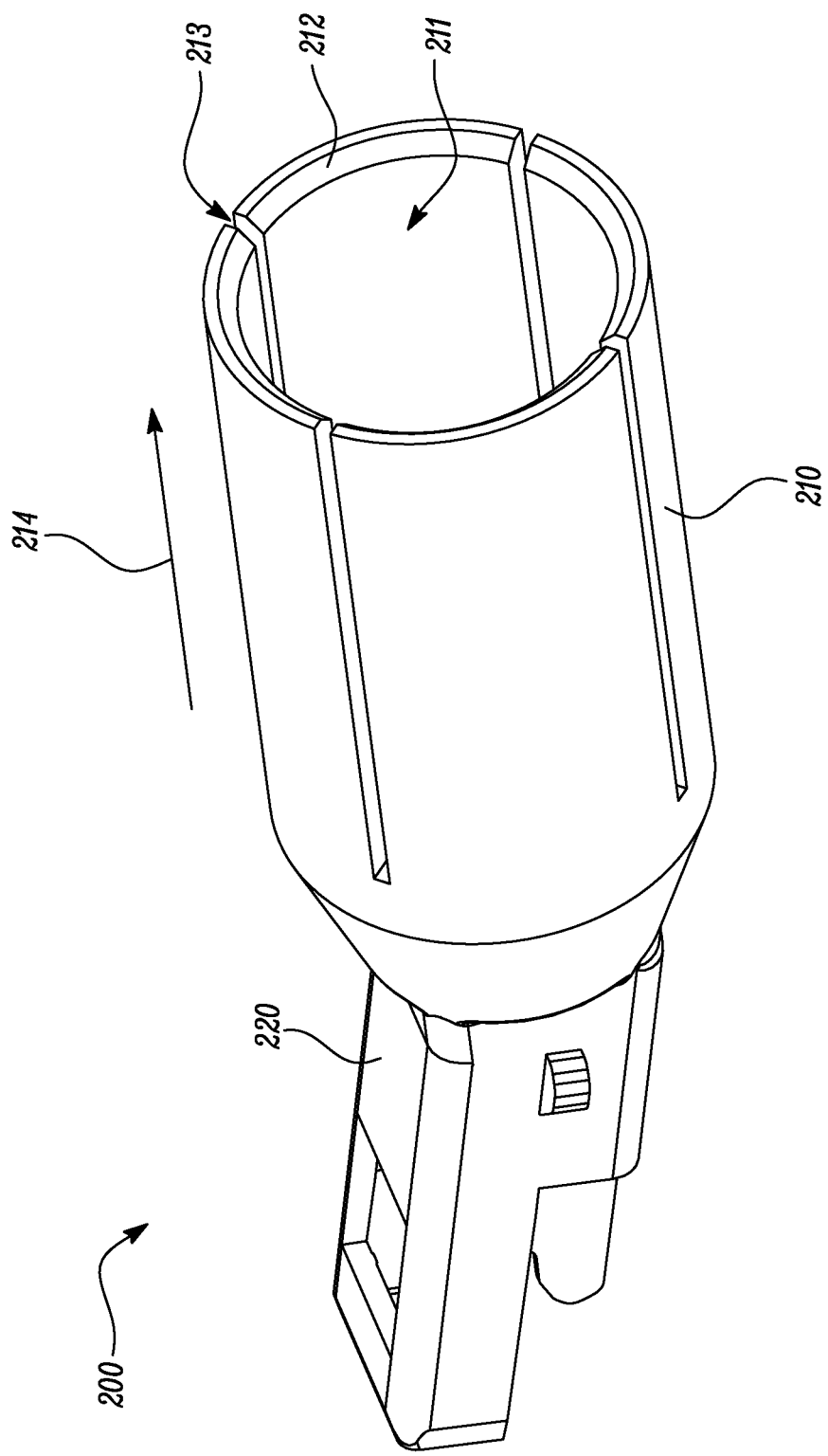
Figure 3C:
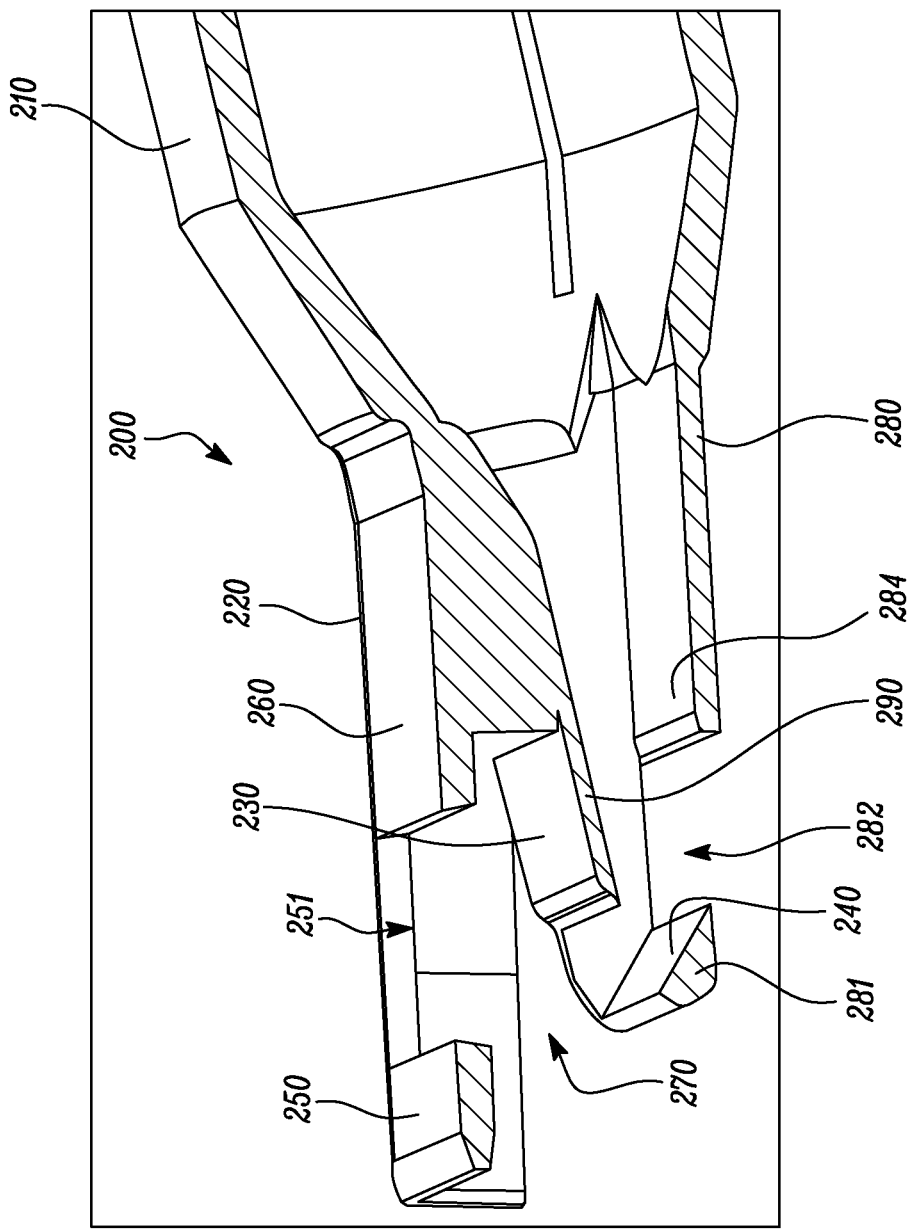
FIGS. 3C-3D are different sectional views of the optical adaptor according to one embodiment of the present disclosure.
Figure 3D:
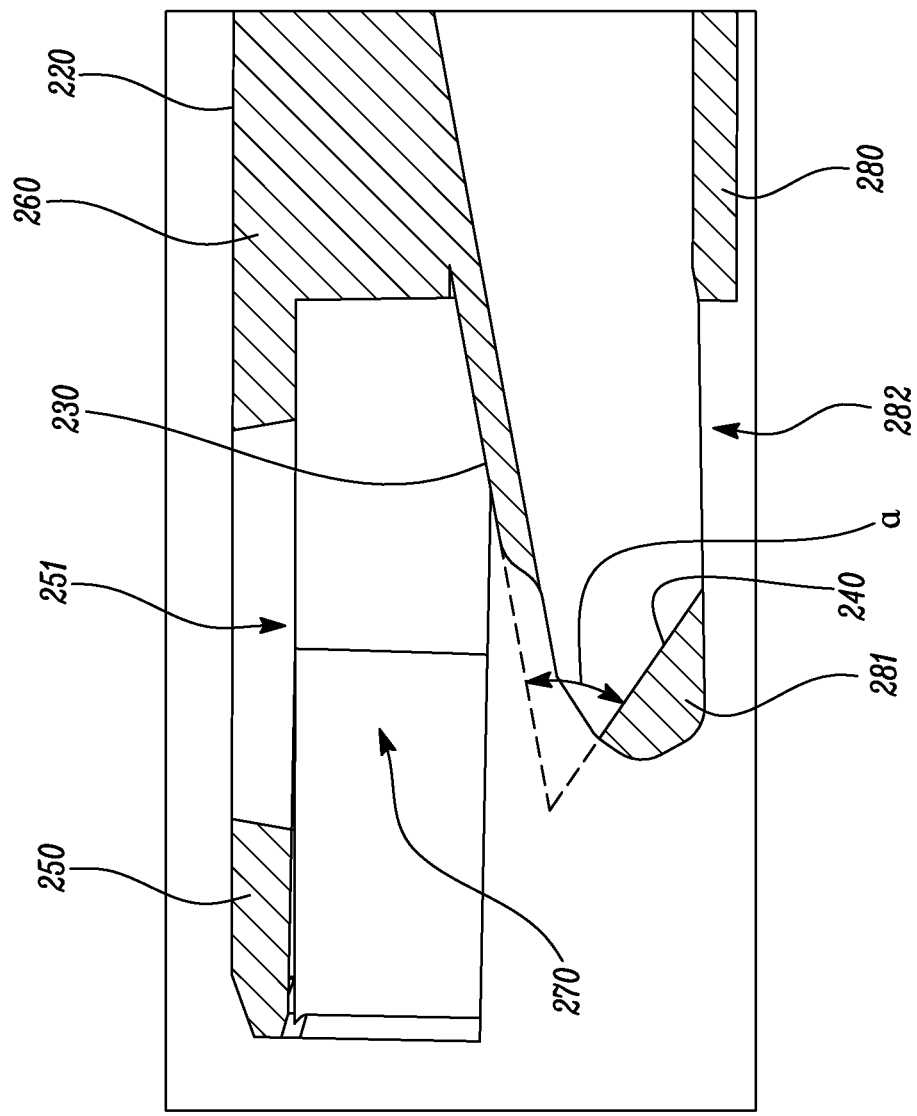

The rear portion 210 of the optical adaptor 200 includes an open rear end 211 (shown in FIG. 3B) for receiving the at least a portion of the inspection probe 300 therein. The front portion 220 of the optical adaptor 200 extends forwardly from the rear portion 210.

The front portion 220 includes an open front end 221 for insertion into the housing 30 of the optical ferrule 100 from an open mating end 31 of the housing 30. In other words, the open front end 221 of the optical adaptor 200 is inserted into the housing 30 from the open mating end 31 of the housing 30. The open front end 221 also receives at least a portion of the desired surface 10 (shown in FIG. 4B) of the optical ferrule 100 for inspection by the inspection probe 300 received in the open rear end 211 (shown in FIG. 3B).

The front portion 220 includes a receiving surface 230 for receiving and supporting the at least a portion of the optical ferrule 100. When the front portion 220 of the optical adaptor 200 is inserted in the housing 30 of the optical ferrule 100, the receiving surface 230 causes the optical ferrule 100 to change its position relative to the housing 30 from the first position 101 to a different second position 102 (shown in FIG. 6B).

The front portion 220 of the optical adaptor 200 further includes an image forming surface 240 for forming an image 11 of the desired surface 10 (shown in FIG. 4B) of the optical ferrule 100. The image 11 is captured by the inspection probe 300 for inspection purposes. The receiving surface 230 may tilt the optical ferrule 100 upward.

As shown in FIG. 2, the front portion 220 of the optical adaptor 200 includes a flange 250 extending forwardly from a top wall 260 of the front portion 220. The flange 250 at least partially covers the receiving and image forming surfaces 230, 240. The flange 250 and the receiving surface 230 of the optical adaptor 200 define an air space 270 therebetween. When the at least a portion of the optical ferrule 100 is received and supported by the receiving surface 230, the at least a portion of the optical ferrule 100 is disposed in the air space 270.

The flange 250 defines a first opening 251 therein to allow a viewing of the at least a portion of the optical ferrule 100 when the at least a portion of the optical ferrule 100 is received and supported by the receiving surface 230. In some embodiments, the first opening 251 allows a viewing of at least one of the receiving and image forming surfaces 230, 240. In some embodiments, the first opening 251 allows a placement of a mirror 80 (shown in FIG. 8) in the front portion 220. In some other embodiments, the first opening 251 allows a placement of an optical prism 70 (shown in FIG. 7) in the front portion 220. The placement may be achieved by any suitable attachment method, such as gluing, mechanical attachment, and so forth.

The front portion 220 further includes a bottom wall 280 extending forwardly from the rear portion 210 of the optical adaptor 200. The bottom wall 280 has an inclined front end segment 281 including the image forming surface 240. The image forming surface 240 is disposed on an interior side 284 of the bottom wall 280, proximate to the open front end 221. The front portion 220 further includes a middle wall 290 disposed between the top and bottom walls 260, 280. The middle wall 290 has a support surface portion facing the top wall 260. The support surface portion includes the receiving surface 230.

In some embodiments, the bottom wall 280 of the optical adaptor 200 defines a second opening 282 therein to allow a viewing of at least the image forming surface 240. In some embodiments, the second opening 282 may allow the placement of the mirror 80 (shown in FIG. 8) in the front portion 220 of the optical adaptor 200. In some other embodiments, the second opening 282 allows the placement of the optical prism 70 (shown in FIG. 7) in the front portion 220 of the optical adaptor 200. The bottom wall 280 of the optical adaptor 200 includes a stop portion 283, such that when the front portion 220 of the optical adaptor 200 is inserted into the housing 30 of the optical ferrule 100, the stop portion 283 contacts a front edge 34 of the housing 30 to prevent further insertion of the optical adaptor 200 into the housing 30.

A light redirecting surface 50 (shown in FIG. 4A) of the optical ferrule 100 is configured to receive light 61 along a first direction 61a from an optical fiber 60, received and supported in a groove 40 (shown in FIG. 4A), and redirect the received light 61 along a different second direction 62a. The redirected light 62 exits the optical ferrule 100 through the desired surface 10 (shown in FIG. 4B) of the optical ferrule 100 as an exit light 63. Light 61 received by the optical fiber 60 can be visible light or infrared light.

In some embodiments, an angle between the first direction 61a and the second direction 62a may be less than about 95 degrees, less than about 90 degrees, or less than about 85 degrees. In some embodiments, an angle between the redirected light 62 exiting the optical ferrule 100 and the exit light 63 may be less than about 5 degrees, less than about 4 degrees, or less than about 2 degrees. The image forming surface 240 of the optical adaptor 200 is configured to receive the exit light 63 and redirect the exit light 63 as a redirected exit light 64 toward the inspection probe 300. The redirected exit light 64 received by the inspection probe 300 may enable inspection of the desired surface 10 of the optical ferrule 100. Specifically, the redirected exit light 64 may enable the inspection probe 300 to capture the image 11 of the desired surface 10. In some embodiments, the redirected exit light 64 may enable an inspection of quality or intensity of light transmitted by the optical ferrule 100.

FIGS. 3A-3D illustrate different views of the optical adaptor 200. The optical adaptor 200 may be made of any suitable material, such as a metal, an alloy, a composite, a plastic, and so forth. The optical adaptor 200 may have a single part or a multi-part configuration. Referring to FIGS. 2 and 3A-3D, the optical adaptor 200 has the rear portion 210 and the front portion 220. The front portion 220 extends forwardly from the rear portion 210. The rear portion 210 includes the open rear end 211 for receiving the at least a portion of the inspection probe 300. The front portion 220 of the optical adaptor 200 includes the open front end 221 for insertion into the housing 30 and receiving the at least a portion of the desired surface 10 (shown in FIG. 4B) of the optical ferrule 100.

In the illustrated embodiment, the rear portion 210 has a substantially circular cross-section. However, the cross-section of the rear portion 210 may have any suitable shape, such as rectangular, elliptical, polygonal and so forth, and may be varied as per a shape of the inspection probe 300. In some embodiments, the cross-section of the rear portion 210 may be similar to the shape of the inspection probe 300.

The rear portion 210 includes a plurality of resilient segments 212 defining a plurality of slots 213 therebetween extending along a length 214 of the rear portion 210, such that as the at least a portion of an inspection probe 300 is received in the rear portion 210 of the optical adaptor 200. In some embodiments, the resilient segments 212 flex away from each other during the insertion of the at least a portion of an inspection probe 300 into the optical adaptor 200. Further, the resilient segments 212 may secure the inspection probe 300 to the rear portion 210 upon insertion. Therefore, the optical adaptor 200 may be easily retrofitted to various commercially available inspection probes.

In the illustrated embodiment, the front portion 220 has a substantially rectangular cross-section. However, the cross-section of the front portion 220 may have any suitable shape, such as circular, elliptical, polygonal and so forth, and may be varied as per a shape of the housing 30. In some embodiments, the cross-section of the front portion 220 may be similar to the shape of the housing 30.

Figure 6A:
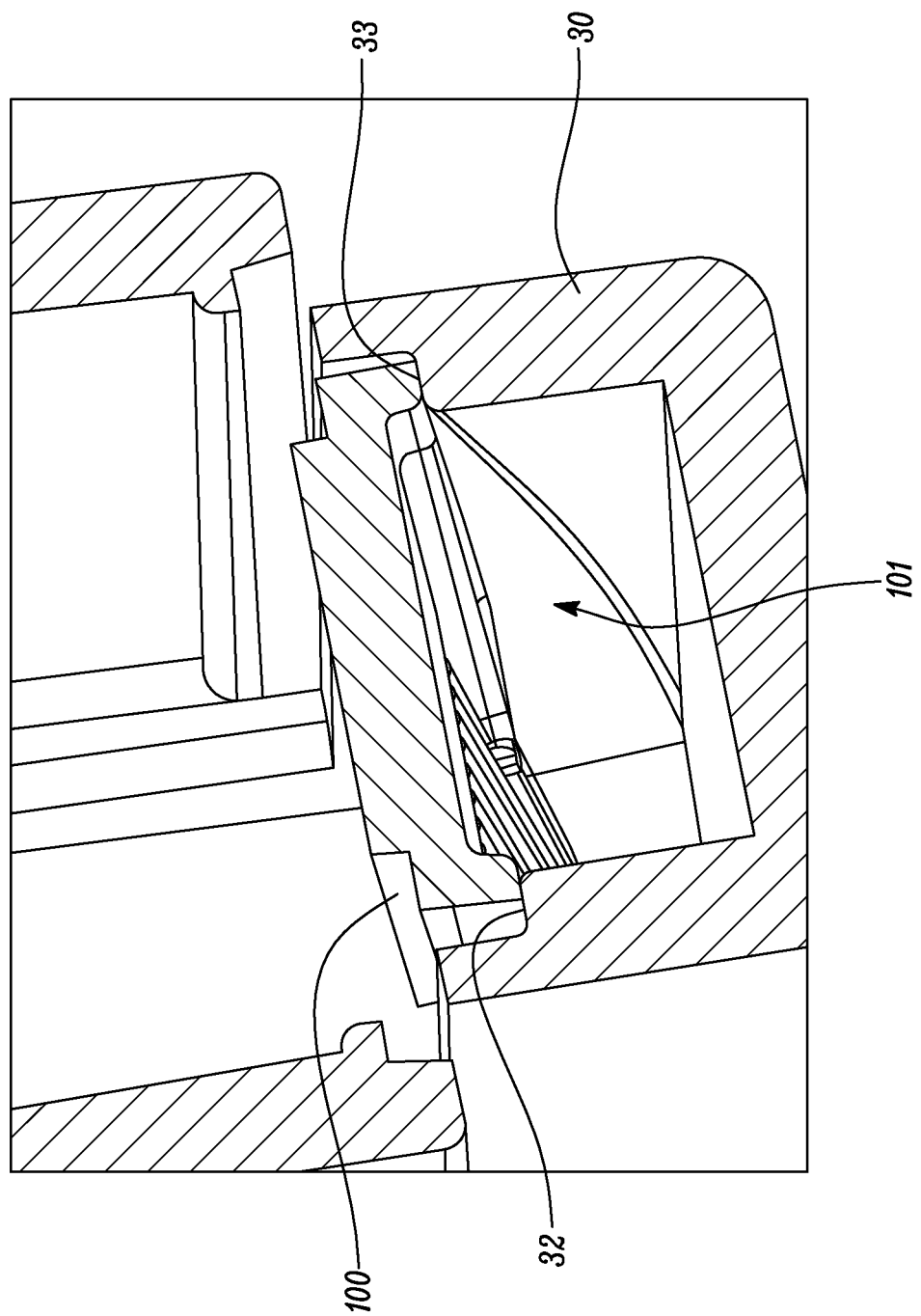
FIG. 6A is a sectional view of the optical ferrule in a first position relative to a housing according to one embodiment of the present disclosure.
Figure 6B:
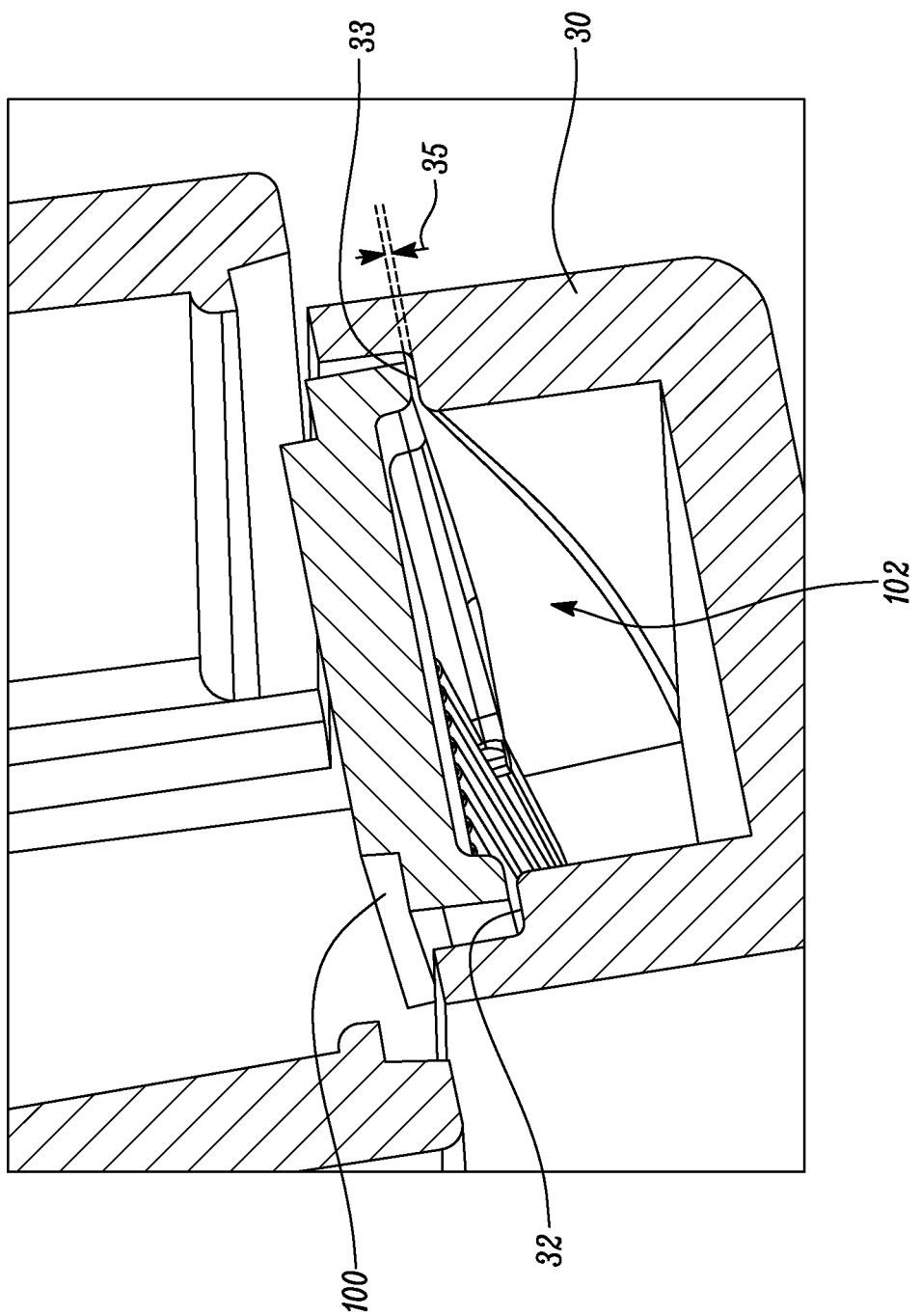
FIG. 6B is a sectional view of the optical ferrule in a second position relative to the housing according to one embodiment of the present disclosure.

The receiving surface 230 of the optical adaptor 200 receives and supports the at least a portion of the optical ferrule 100 thereon and causes the optical ferrule 100 to change its position relative to the housing 30 from the first position 101 (shown in FIG. 6A) to the different second position 102 (shown in FIG. 6B). In the illustrated embodiments, the receiving surface 230 of the optical adaptor 200 is substantially planar. In some other embodiments, the receiving surface 230 may have a curved configuration.

The image forming surface 240 forms the image 11 of the desired surface 10 (shown in FIG. 4B) of the optical ferrule 100. The image forming surface 240 may have any suitable shape, for example, planar, curved, or a combination thereof. In the illustrated embodiment, the image forming surface 240 of the optical adaptor 200 is substantially planar. In some other embodiments, the image forming surface 240 of the optical adaptor 200 may have a curved configuration. For example, the image forming surface 240 may be concave to increase a field of view of the image forming surface 240.

In some embodiments, the image forming surface 240 is a reflective surface. In some embodiments, the image forming surface 240 of the optical adaptor 200 is a mirror surface having a reflectance greater than about 50% for substantially normally incident visible light. In some embodiments, the reflectance of the mirror surface is greater than about 60%, greater than about 70%, or greater than about 80% for substantially normally incident visible light. In some embodiments, the image forming surface 240 may have a reflectance greater than about 50% for substantially normally incident light in a wavelength range other than the visible range, such as infrared light. The image forming surface 240 of the optical adaptor 200 may be a metallic mirror surface (e.g., aluminum, silver), a dielectric mirror surface, or any suitable mirror surface. In an example, the image forming surface 240 may include a multi-layered dielectric coating. In another example, the image forming surface 240 includes a semiconductor wafer, such as a silicon wafer.

Figure 7:
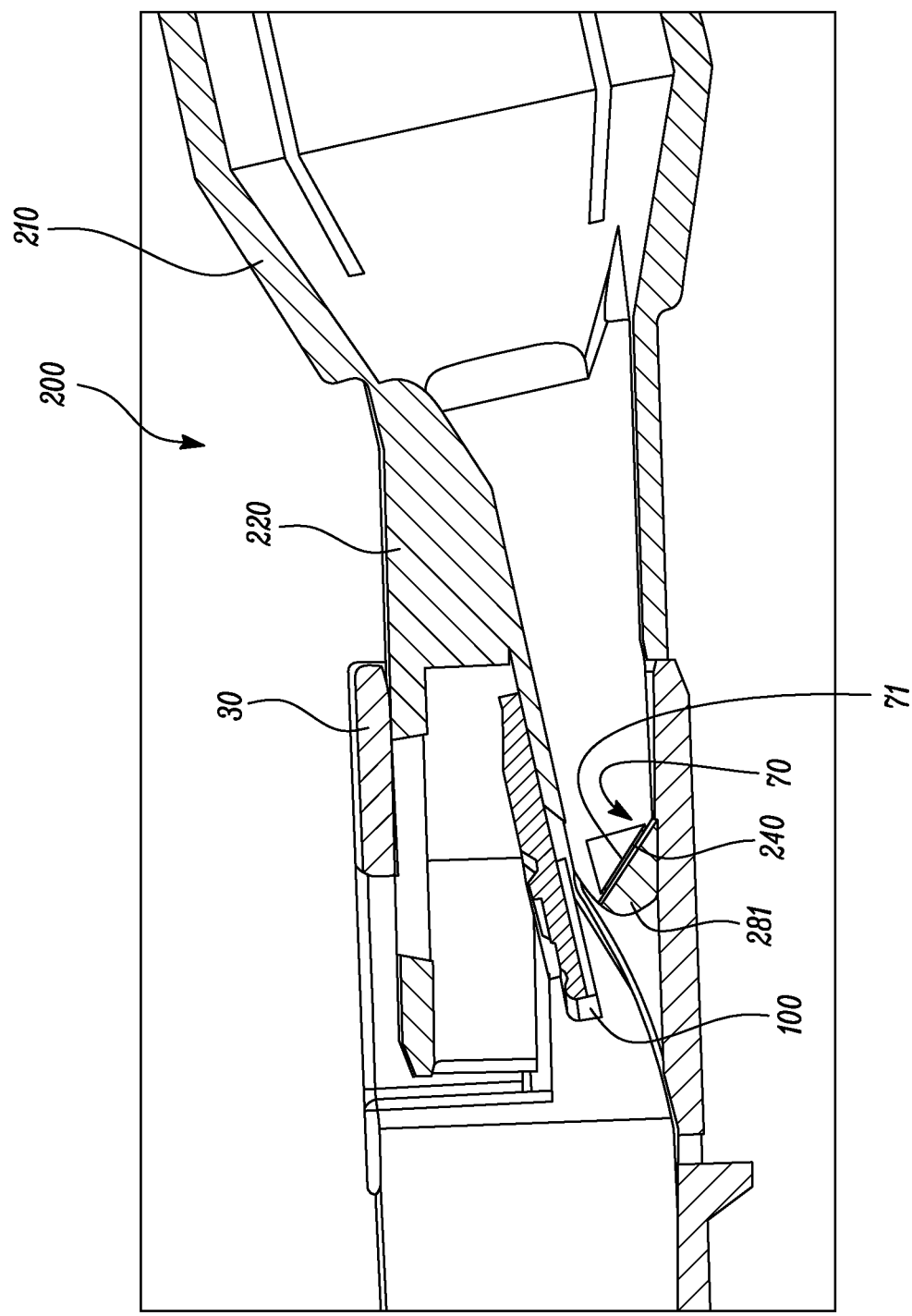
FIG. 7 is a detailed sectional view of the housing and the optical adaptor including an optical prism according to one embodiment of the present disclosure.

In some other embodiments, the front portion 220 of the optical adaptor 200 may include the optical prism 70 (shown in FIG. 7). A major surface 71 of the optical prism 70 may include the image forming surface 240 of the optical adaptor 200. In some other embodiments, the front portion 220 may include the mirror 80 (shown in FIG. 8). A light reflecting major surface 81 of the mirror 80 may include the image forming surface 240 of the optical adaptor 200.

The receiving and image forming surfaces 230, 240 form an oblique angle α therebetween. In some embodiments, the oblique angle α may be less than about 80 degrees, less than about 70 degrees, less than about 60 degrees, less than about 45 degrees, less than about 30 degrees, or less than about 20 degrees. Upon mating of the optical adaptor 200 with the housing 30, the receiving surface 230 may position the optical ferrule 100 at the oblique angle α relative to the image forming surface 240 irrespective of the first position 101 of the optical ferrule 100 relative to the housing 30.

The front portion 220 further includes the flange 250 extending forwardly from the top wall 260 of the front portion 220. The flange 250 at least partially covers the receiving and image forming surfaces 230, 240. The flange 250 and the receiving surface 230 define the air space 270 therebetween. When the at least a portion of the optical ferrule 100 is received and supported by the receiving surface 230, the at least a portion of the optical ferrule 100 is disposed in the air space 270. In the illustrated embodiment, the flange 250 is substantially U-shaped. A shape of the flange 250 may vary as per desired application attributes. For example, the shape of the flange 250 may depend upon the shape of the housing 30.

The front portion 220 further includes the bottom wall 280 which extends forwardly from the rear portion 210 of the optical adaptor 200. The bottom wall 280 has the inclined front end segment 281 including the image forming surface 240. The image forming surface 240 is disposed on the interior side 284 of the bottom wall 280 proximate the open front end 221.

In some embodiments, each of the opposing top and bottom walls 260, 280 of the front portion 220 may have a substantially planar configuration. In some other embodiments, one or more of the opposing top and bottom walls 260, 280 may have a curved configuration. In some embodiments, the opposing top and bottom walls 260, 280 are substantially parallel to each other. In some other embodiments, an angle between the opposing top and bottom walls 260, 280 may be less than about 3 degrees, less than about 5 degrees, or less than about 10 degrees. The opposing top and bottom walls 260, 280 extend along a length of the optical adaptor 200 and define the opposing open front and rear ends 221, 211 of the optical adaptor 200.

The flange 250 defines the first opening 251 therein to allow the viewing of at least the at least a portion of the optical ferrule 100 when the at least a portion of the optical ferrule 100 is received and supported by the receiving surface 230. In some embodiments, the first opening 251 is defined in the top wall 260 proximate the open front end 221. In some embodiments, the first opening 251 further allows the viewing of at least one of the receiving and image forming surfaces 230, 240. In some embodiments, the first opening 251 may further allow the placement of the mirror 80 (shown in FIG. 8) in the front portion 220 of the optical adaptor 200. In some other embodiments, the first opening 251 may further allow the placement of the optical prism 70 (shown in FIG. 7) in the front portion 220 of the optical adaptor 200. The first opening 251 may have any suitable shape, such as rectangular, circular, elliptical, polygonal, and so forth.

The bottom wall 280 defines the second opening 282 therein to allow the viewing of at least the image forming surface 240. In some embodiments, the second opening 282 further allows the placement of the mirror 80 (shown in FIG. 8) in the front portion 220. In some other embodiments, the second opening 282 further allows the placement of the optical prism 70 (shown in FIG. 7) in the front portion 220. The second opening 282 may have any suitable shape, such as rectangular, circular, elliptical, polygonal, and so forth.

The middle wall 290 is disposed between the top and bottom walls 260, 280 and includes the receiving surface 230 facing the top wall 260. In some embodiments, the middle wall 290 has a substantially planar configuration. In some other embodiments, the middle wall 290 may have a curved configuration. The receiving surface 230 may be interchangeably referred to as a support surface portion 230. The middle wall 290 includes the support surface portion 230 facing the top wall 260. In some embodiments, the support surface portion 230 of the optical adaptor 200 is substantially planar. In some other embodiments, the support surface portion 230 may have a curved configuration.

The image forming surface 240 may be interchangeably referred to as a reflective surface 240. The reflective surface 240 is disposed on the interior side 284 of the bottom wall 280 proximate the open front end 221. The reflective surface 240 allows the viewing of the optical ferrule 100 from the open rear end 211. In some embodiments, the reflective surface 240 of the optical adaptor 200 is a mirror surface having a reflectance greater than about 50% for substantially normally incident visible light. In some embodiments, the reflectance of the reflective surface 240 is greater than about 60%, greater than about 70%, or greater than about 80% for substantially normally incident visible light. In some embodiments, the reflective surface 240 may have a reflectance greater than about 50% for substantially normally incident light in a wavelength range other than the visible range, such as infrared light. The reflective surface 240 of the optical adaptor 200 may be a metallic mirror surface (e.g., aluminum, silver), a dielectric mirror surface, or any suitable mirror surface. In an example, the reflective surface 240 may include a multi-layered dielectric coating. In another example, the reflective surface 240 includes a semiconductor wafer, such as a silicon wafer. In some embodiments, the reflective surface 240 of the optical adaptor 200 is substantially planar. In some other embodiments, the reflective surface 240 of the optical adaptor 200 may have a curved shape.

The reflective surface 240 of the optical adaptor 200 generally faces the middle wall 290 and forms the oblique angle α with the support surface portion 230. In other words, the support surface portion 230 and the reflective surface 240 form the oblique angle α therebetween.

The optical adaptor 200 is configured to mate with the optical connector assembly 400 when the top and bottom walls 260, 280 are at least partially inserted into the housing 30 of the optical connector assembly 400. The insertion of the optical adaptor 200 into the housing 30 causes the optical ferrule 100 to rest on the support surface portion 230 and change its position relative to the housing 30. The reflective surface 240 allows a viewing of the optical ferrule 100 from the open rear end 211.

The first opening 251 is defined in the top wall 260 proximate the open front end 221. In some embodiments, the first opening 251 therein allows a viewing of at least one of the support surface portion 230, the reflective surface 240 and the optical ferrule 100 when the at least a portion of the optical ferrule 100 is received and supported by the support surface portion 230.

In some embodiments, the second opening 282 is defined in the bottom wall 280 proximate the open front end 221 to allow at least one of a viewing of the reflective surface 240 and a placement of the mirror 80 (shown in FIG. 8) or the optical prism 70 (shown in FIG. 7) in the front portion 220 of the optical adaptor 200. In some embodiments, the light reflecting major surface 81 of the mirror 80 or the major surface 71 of the optical prism 70 includes the reflective surface 240.

Figure 4A:
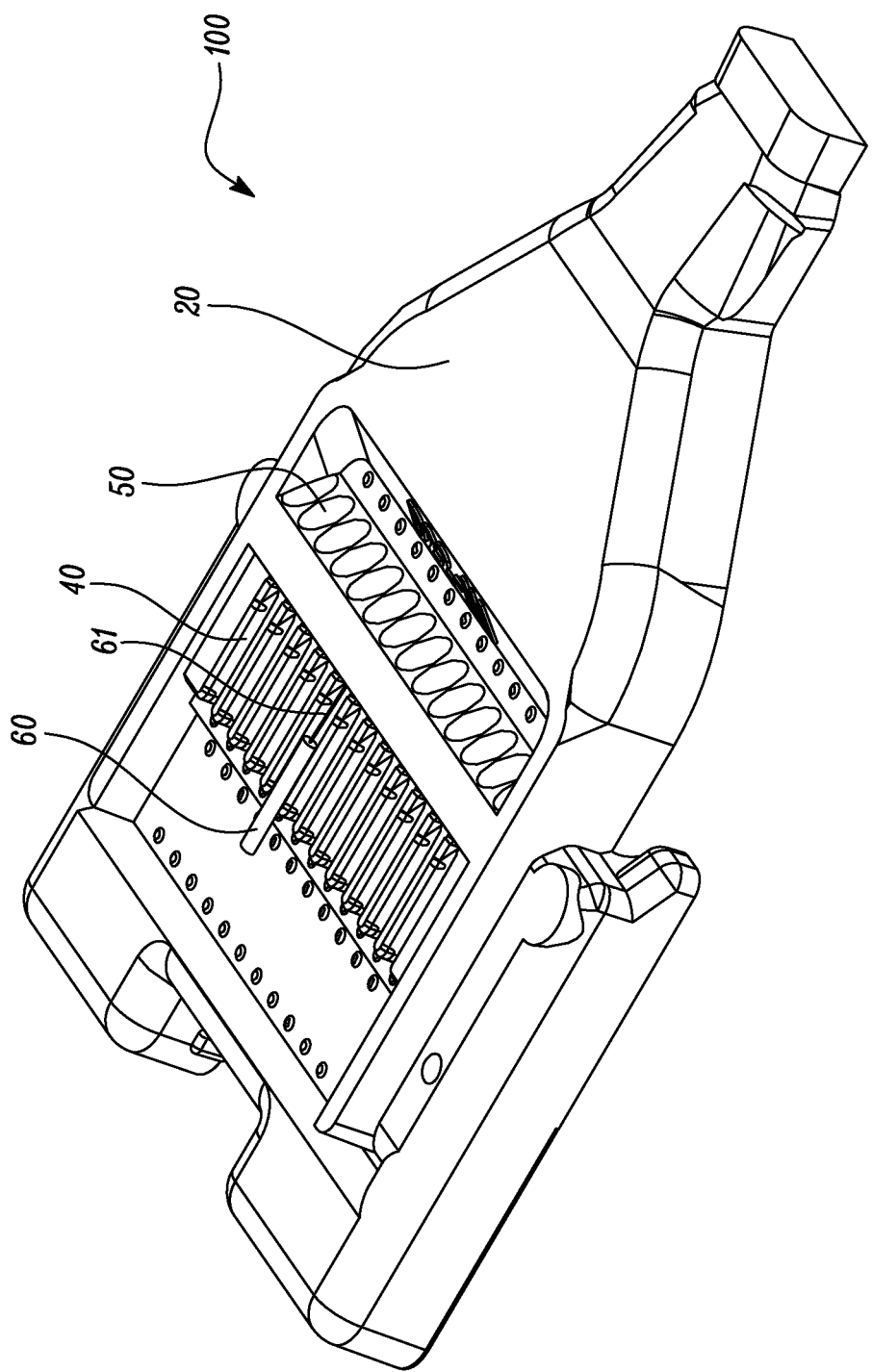
FIGS. 4A-4B are perspective views of top and bottom surfaces, respectively, of the optical ferrule according to one embodiment of the present disclosure.
Figure 4B:
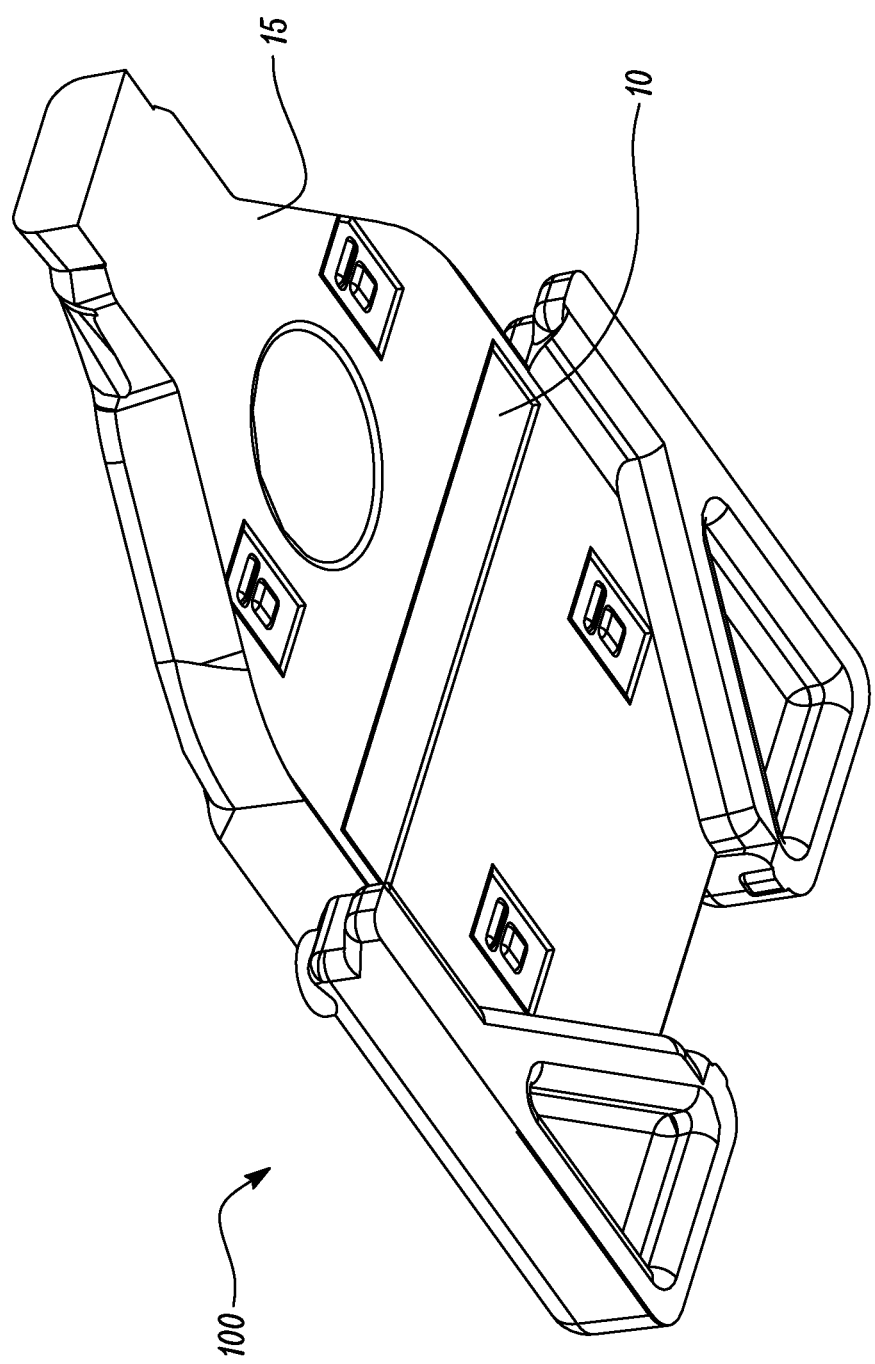

FIGS. 4A and 4B illustrate top and bottom perspective views of the optical ferrule 100, respectively. The optical ferrule 100 may be made of any suitable material, such as a metal, an alloy, a composite, a plastic, a ceramic, and so forth. The optical ferrule 100 has opposing major top and bottom surfaces 20, 15. In the illustrated embodiment, the bottom surface 15 includes the desired surface 10 of the optical ferrule 100. The optical ferrule 100 may receive one or more optical fibers 60. The optical ferrule 100 may have a front ferrule portion and a rear ferrule portion. The rear ferrule portion may be substantially rectangular and receives the one or more optical fibers 60. The front ferrule portion extends forwardly from the rear ferrule portion. The front ferrule portion may have a tapered shape. The optical ferrule 100 may further include an attachment mechanism disposed on the rear ferrule portion.

FIG. 4A shows the major top surface 20 of the optical ferrule 100. The major top surface 20 includes the grooves 40 and the light redirecting surface 50. Referring to FIGS. 2 and 4A, the light redirecting surface 50 is configured to receive light 61 along the first direction 61a from the optical fiber 60. The light redirecting surface 50 also redirects the received light 61 along the different second direction 62a. The one or more optical fibers 60 are received and supported in the grooves 40. The grooves 40 may be U-shaped, V-shaped, or Y-shaped. The grooves 40 are configured for receiving and securing the optical fibers 60. The optical fibers 60 may be secured to the grooves 40 by any suitable attachment method, such as gluing. The grooves 40 may help in the alignment of the one or more optical fibers 60. The number of optical fibers 60 and the number of grooves 40 may be varied as per desired application attributes. In some embodiments, the number of optical fibers 60 and the number of grooves 40 may be equal. In some other embodiments, the number of optical fibers 60 may be less than the number of grooves 40.

FIG. 4B shows the bottom surface 15. The bottom surface 15 includes the desired surface 10 of the optical ferrule 100. The desired surface 10 may be substantially rectangular. Further, the desired surface 10 may be recessed relative to the rest of the bottom surface 15. However, a shape and configuration of the desired surface 10 may vary as per application attributes.

Figure 5:
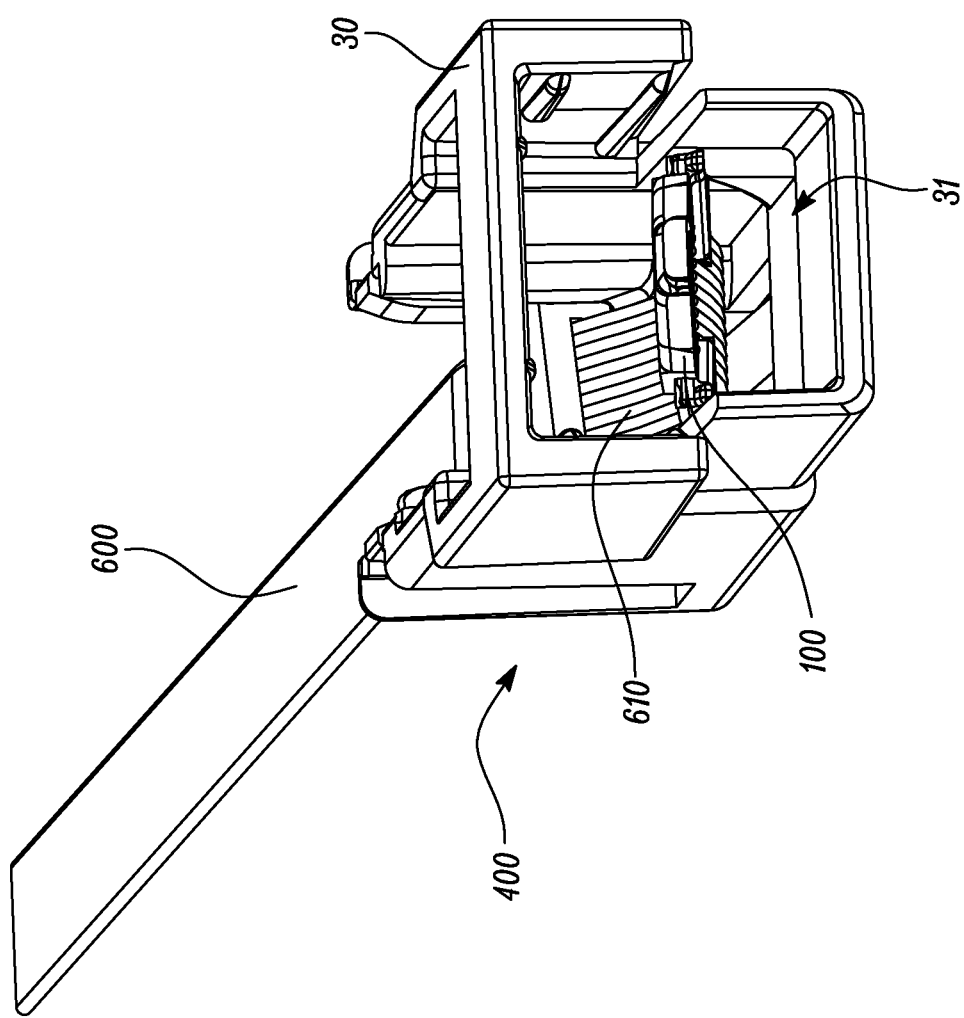
FIG. 5 is a perspective view of the optical connector assembly according to one embodiment of the present disclosure.

FIG. 5 illustrates the optical connector assembly 400. The optical connector assembly 400 includes the housing 30 in which the optical ferrule 100 is disposed. The housing 30 may have an integral construction or a multi-part construction. The housing 30 may be made of any suitable material, such as a metal, an alloy, a composite, a plastic, a ceramic, and so forth.

The optical connector assembly 400 further includes an optical cable 600 including a plurality of optical fibers 610. The optical cable 600 may be attached and optically coupled to the optical ferrule 100. The optical fiber 60 shown in FIG. 4A may be one of the optical fibers 610. A number of optical fibers 610 of the optical cable 600 may be varied as per application attributes.

Referring to FIGS. 2 and 5, the plurality of optical fibers 610 are attached and optically coupled to the optical ferrule 100. The housing 30 of the optical ferrule 100 has the open mating end 31. The front portion 220 of the optical adaptor 200 is inserted into the housing 30 from the open mating end 31. Shape and dimensions of the housing 30 may be varied as per desired application attributes. For example, the shape and dimensions of the housing 30 may conform to certain industry standards.

FIGS. 6A and 6B illustrate the optical connector assembly 400 (shown in FIG. 5) in unmated and fully mated states, respectively. FIG. 6A shows the optical ferrule 100 in the first position 101 relative to the housing 30. In the first position 101, the optical ferrule 100 rests on at least one support surface 32, 33 of the housing 30. The optical ferrule 100 rests on the at least one support surface 32, 33 when the optical ferrule 100 is not inserted in the front portion 220 of the optical adaptor 200. The first position 101 may therefore be the normal position of the optical ferrule 100 in the housing 30. In the illustrated embodiment, the support surfaces 32, 33 are disposed at opposite walls of the housing 30. Each of the support surfaces 32, 33 may be defined by a substantially L-shaped region of the housing 30.

FIG. 6B shows the optical ferrule 100 in the second position 102 relative to the housing 30. Referring to FIGS. 2 and 6B, when the receiving surface 230 of the optical adaptor 200 receives a portion of the optical ferrule 100, the optical ferrule 100 changes its position relative to the housing 30 from the first position 101 to the different second position 102. In the second position 102, the optical ferrule 100 no longer rests on the at least one support surface 32, 33 of the housing 30. Consequently, a gap 35 may be formed between the optical ferrule 100 and the support surfaces 32, 33 of the housing 30. The optical ferrule 100 may be pushed upwards by the receiving surface 230 on insertion of the optical adaptor 200 into the housing 30, thereby forming the gap 35. The upward push and formation of the gap 35 in the second position 102 may tilt the optical ferrule 100 by a tilt angle relative to the first position 101. In some embodiments, the tilt angle is less than about 30 degrees, less than about 20 degrees, less than about 10 degrees, or less than about 5 degrees.

FIG. 7 illustrates the optical adaptor 200 including the optical prism 70. The optical prism 70 may be a triangular prism. Further, the optical prism 70 may be made of a suitable transparent material, such as glass, plastic, mineral, and so forth. The optical prism 70 includes the major surface 71. In the illustrated embodiment of FIG. 7, the major surface 71 of the optical prism 70 includes the image forming surface or the reflective surface 240 of the optical adaptor 200. In some cases, the optical prism 70 may be placed on two or more spacers (not shown) disposed on the inclined front end segment 281 of the front portion 220. An air gap may be created between the major surface 71 and the inclined front end segment 281 due to the spacers. The air gap may enable total internal reflection (TIR) of light incident on the major surface 71 of the optical prism 70. Specifically, an interface between the material of the optical prism 70 and air at the major surface 71 may result in TIR of incident light.

Figure 8:
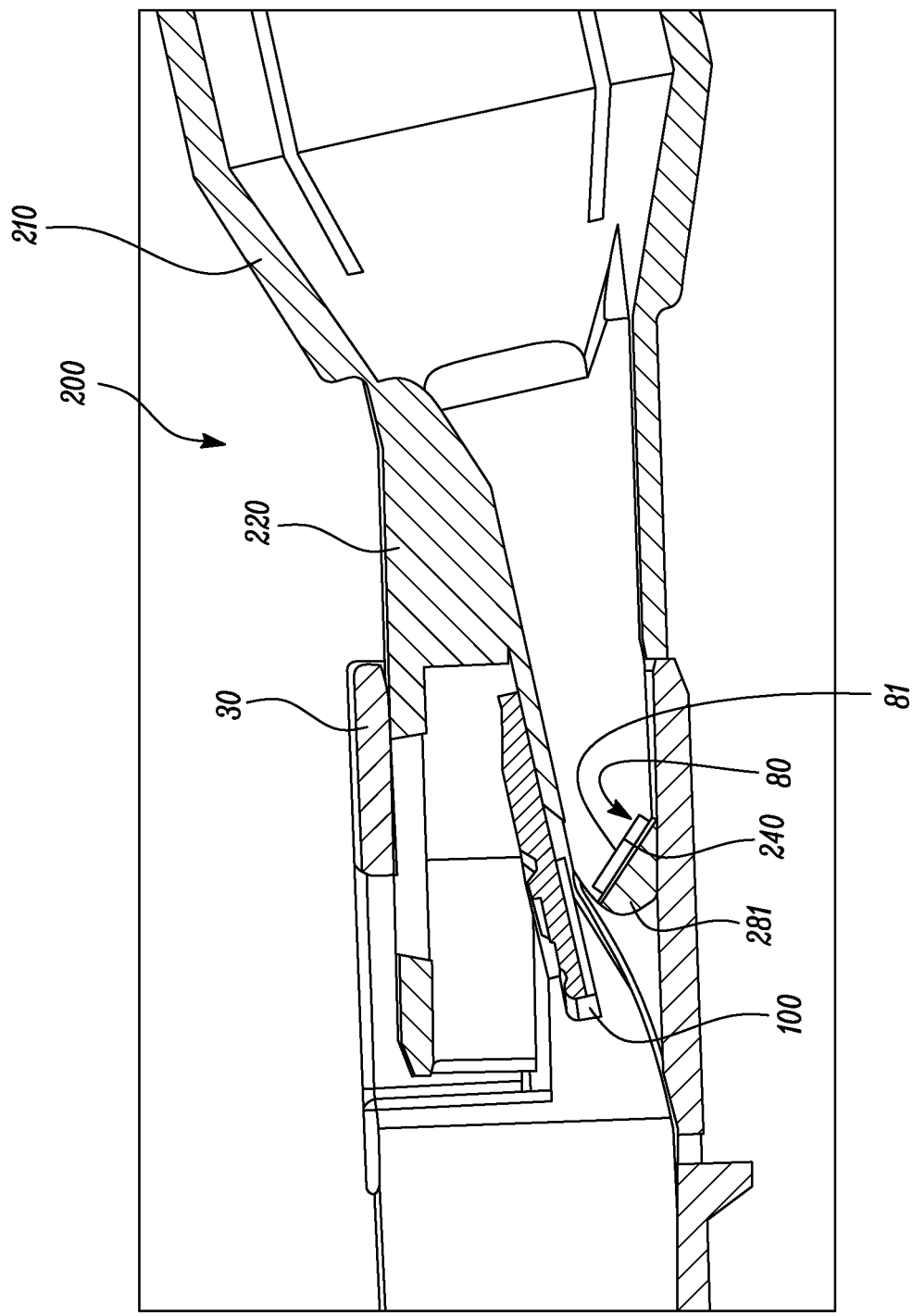
FIG. 8 is a detailed sectional view of the housing and the optical adaptor including a mirror according to one embodiment of the present disclosure.

FIG. 8 illustrates the optical adaptor 200 including the mirror 80. The mirror 80 includes the light reflecting major surface 81. In the illustrated embodiment of FIG. 8, the light reflecting major surface 81 of the mirror 80 includes the image forming surface or the reflective surface 240 of the optical adaptor 200. In this embodiment, the mirror 80 may be attached to the inclined front end segment 281 of the front portion 220. The mirror 80 may be attached to the inclined front end segment 281 by any suitable method, such as gluing, mechanical coupling etc. A shape of the mirror 80 may be varied as per desired application attributes. For example, the shape of the mirror 80 may be planar, concave, convex, hemispherical, and so forth. The mirror 80 may be a metal and glass mirror, a dielectric mirror, and the like.

Figure 9:
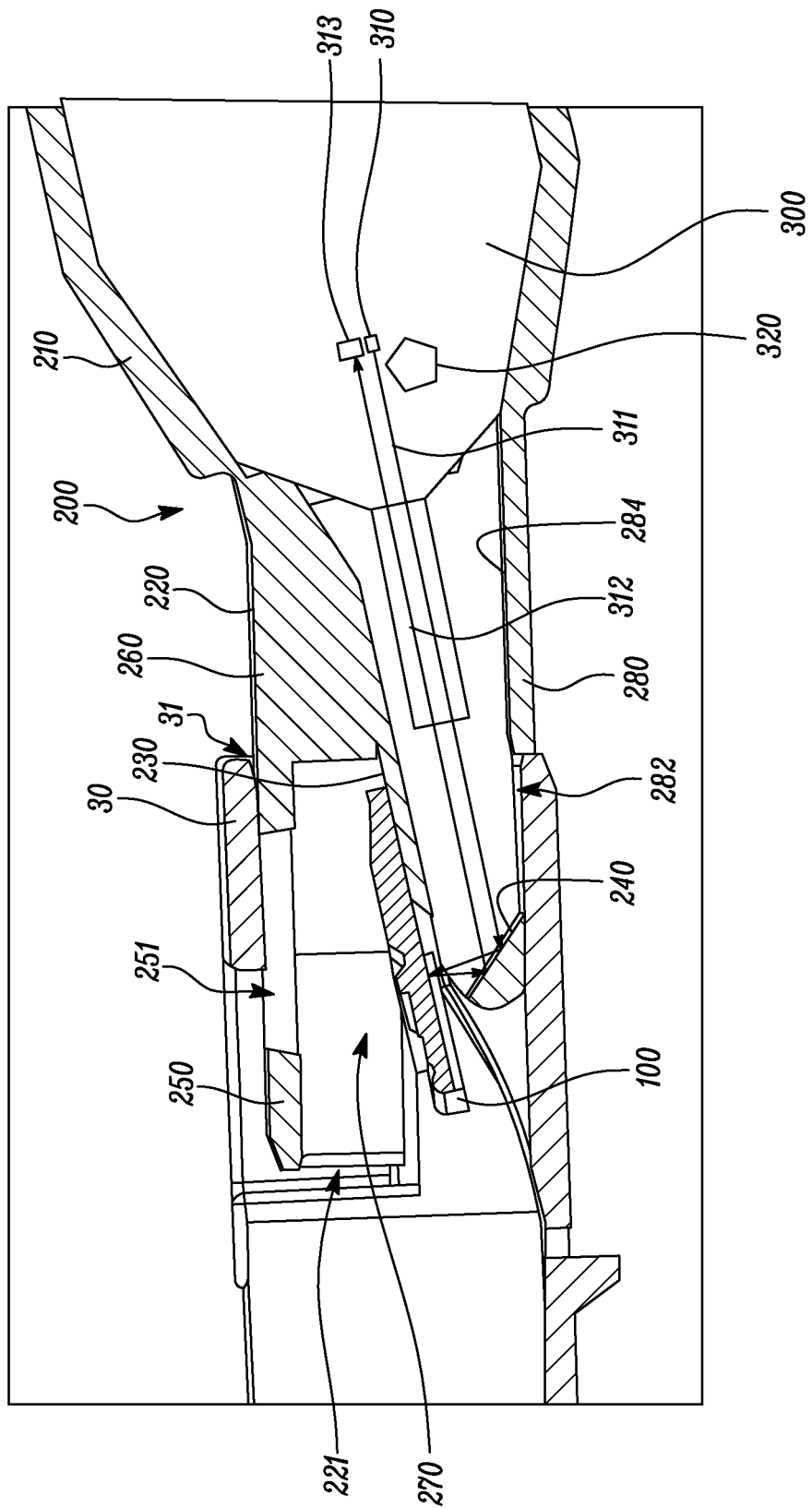
FIG. 9 is a detailed sectional view of the optical adaptor facilitating inspection of the optical ferrule by another inspection probe according to another embodiment of the present disclosure.

FIG. 9 illustrates another embodiment of the inspection probe 300. As shown in FIG. 9, a light source 310 and an optical detector 313 are disposed in the inspection probe 300. Specifically, the image forming surface 240 is configured to redirect light 311 from the light source 310. The light source 310 is disposed in the inspection probe 300 toward the desired surface 10 (shown in FIG. 4B) of the optical ferrule 100. The image forming surface 240 is further configured to redirect light 312 reflected by the desired surface 10 toward the optical detector 313 disposed in the inspection probe 300. The light source 310 may be any suitable light source, such as a light-emitting diode (LED), a laser light source, and so forth. In some embodiments, the light source 310 is a laser light source. In such cases, light 311 may be interchangeably referred to as laser beam 311. Further, the light source 310 may be interchangeably referred to as a laser light source 310. The inspection probe 300 further includes a laser scanner 320 configured to scan the desired surface 10 of the optical ferrule 100 with laser beam 311 emitted by the laser light source 310. The laser scanner 320 may rotate within an angular range. The inspection probe 300 of FIG. 9 is used to inspect the desired surface 10 of the optical ferrule 100 when the optical fibers 610 (shown in FIG. 5) or 60 (shown in FIG. 4A) optically coupled to the optical ferrule 100 are not transmitting light.

The optical adaptor 200 may further allow visual inspection of the desired surface 10 of the optical ferrule 100 without removing the optical ferrule 100 from the housing 30. An engagement between the optical ferrule 100 and the receiving surface or the support surface portion 230 may cause the optical ferrule 100 change its position relative to the housing 30. The receiving surface 230 may position the optical ferrule 100 at a predetermined angle (e.g., the oblique angle α) with respect to the image forming surface or the reflective surface 240 irrespective of the first position 101 of the optical ferrule 100. The optical adaptor 200 may therefore be used with different optical connector assemblies having different positions of the optical ferrule 100. Further, the reflective surface 240 allows the viewing of the optical ferrule 100 with or without an inspection probe. Moreover, the reflective surface 240 may enable an inspection of quality or intensity of light transmitted by the optical ferrule 100.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical adaptor for facilitating inspection of a desired surface of an optical ferrule by an inspection probe, the optical ferrule disposed in, and having a first position relative to, a housing of the optical ferrule, the optical adaptor comprising:
   a rear portion comprising an open rear end for receiving at least a portion of the inspection probe therein; and
   a front portion extending forwardly from the rear portion and comprising an open front end for insertion into the housing of the optical ferrule from an open mating end of the housing and for receiving at least a portion of the desired surface of the optical ferrule for inspection by the inspection probe received in the open rear end, the front portion comprising:
   a receiving surface for receiving and supporting at least a portion of the optical ferrule thereon and causing the optical ferrule to change its position relative to the housing from the first position to a different second position; and
   an image forming surface for forming an image of the desired surface of the optical ferrule, the image captured by the inspection probe.

2. The optical adaptor of claim 1, wherein when the optical ferrule has the first position relative to the housing, the optical ferrule rests on at least one support surface of the housing, and when the optical ferrule has the second position relative to the housing, the optical ferrule no longer rests on the at least one support surface of the housing.

3. The optical adaptor of claim 1, wherein the receiving surface of the optical adaptor is substantially planar, wherein the image forming surface of the optical adaptor is a mirror surface having a reflectance greater than about 50% for substantially normally incident visible light, and wherein the receiving and image forming surfaces form an oblique angle therebetween.

4. The optical adaptor of claim 1, wherein the front portion further comprises an optical prism, a major surface of the optical prism comprising the image forming surface.

5. The optical adaptor of claim 1, wherein the front portion further comprises a flange extending forwardly from a top wall of the front portion and at least partially covering the receiving and image forming surfaces, the flange and the receiving surface defining an air space therebetween, such that when the at least a portion of the optical ferrule is received and supported by the receiving surface, the at least a portion of the optical ferrule is disposed in the air space, and wherein the flange defines a first opening therein to allow a viewing of at least the at least a portion of the optical ferrule when the at least a portion of the optical ferrule is received and supported by the receiving surface, and wherein the first opening further allows a viewing of at least one of the receiving and image forming surfaces.

6. The optical adaptor of claim 1, wherein the front portion comprises a bottom wall extending forwardly from the rear portion of the optical adaptor, the bottom wall having an inclined front end segment comprising the image forming surface, wherein the bottom wall defines a second opening therein to allow a viewing of at least the image forming surface, and wherein the second opening allows a placement of a mirror in the front portion, a light reflecting major surface of the mirror comprising the image forming surface.

7. The optical adaptor of claim 6, wherein the bottom wall comprises a stop portion, such that when the front portion of the optical adaptor is inserted into the housing of the optical ferrule, the stop portion contacts a front edge of the housing to prevent further insertion of the optical adaptor into the housing.

8. The optical adaptor of claim 1, wherein the optical ferrule comprises opposing major top and bottom surfaces, the bottom surface comprising the desired surface of the optical ferrule, the major top surface comprising a groove and a light redirecting surface, the light redirecting surface configured to receive light along a first direction from an optical fiber received and supported in the groove and redirect the received light along a different second direction, the redirected light exiting the optical ferrule through the desired surface of the optical ferrule as an exit light.

9. The optical adaptor of claim 8, wherein the image forming surface is configured to receive the exit light and redirect the exit light as a redirected exit light toward the inspection probe.

10. The optical adaptor of claim 1, wherein the image forming surface is configured to redirect light from a light source disposed in the inspection probe toward the desired surface of the optical ferrule, and redirect light reflected by the desired surface toward an optical detector disposed in the inspection probe, and wherein the light source comprises a laser light source, and wherein the inspection probe comprises a laser scanner configured to scan the desired surface of the optical ferrule with laser beam emitted by the laser light source.

11. The optical adaptor of claim 1, wherein the rear portion comprises a plurality of resilient segments defining a plurality of slots therebetween extending along a length of the rear portion, such that as the at least a portion of the inspection probe is received in the rear portion of the optical adaptor, the resilient segments flex away from each other.

12. An optical adaptor for mating with an optical connector assembly comprising an optical ferrule disposed in a housing, the optical adaptor comprising:

opposing top and bottom walls extending along a length of the optical adaptor and defining opposing open front and rear ends of the optical adaptor;

a middle wall disposed between the top and bottom walls and comprising a support surface portion facing the top wall; and a reflective surface disposed on an interior side of the bottom wall proximate the open front end, the reflective surface generally facing the middle wall and forming an oblique angle with the support surface portion, such that the optical adaptor is configured to mate with the optical connector when the top and bottom walls are at least partially inserted into the housing of the optical connector, the insertion causing the optical ferrule to rest on the support surface portion and change its position relative to the housing, the reflective surface allowing a viewing of the optical ferrule from the open rear end.

13. The optical adaptor of claim 12, wherein the optical connector assembly further comprises an optical cable comprising a plurality of optical fibers attached and optically coupled to the optical ferrule.

14. The optical adaptor of claim 12 further comprising a first opening defined in the top wall proximate the open front end to allow a viewing of at least one of the support surface portion, the reflective surface, and the optical ferrule when the optical ferrule rests on the support surface portion.

15. The optical adaptor of claim 12 further comprising a second opening defined in the bottom wall proximate the open front end to allow at least one of a viewing of the reflective surface, and a placement of a mirror or an optical prism in a front portion of the optical adaptor, wherein a light reflecting major surface of the mirror or a major surface of the optical prism comprises the reflective surface.

* * * * *